US012664250B2

(12) United States Patent
Nguansiri et al.

(10) Patent No.: US 12,664,250 B2
(45) Date of Patent: Jun. 23, 2026

(54) DELAY-BASED PUF FOR CHIPLET INTERCONNECTS

(71) Applicant: The MITRE Corporation, McLean, VA (US)

(72) Inventors: Nimit Nguansiri, Wilmington, MA (US); Daniel E. Holcomb, Hadley, MA (US); Aleksa Deric, Mendon, MA (US)

(73) Assignee: The MITRE Corporation, McLean, VA (US)

( * ) Notice: Subject to any disclaimer, the term of this patent is extended or adjusted under 35 U.S.C. 154(b) by 161 days.

(21) Appl. No.: 18/101,229

(22) Filed: Jan. 25, 2023

(65) Prior Publication Data

US 2023/0237143 A1     Jul. 27, 2023

Related U.S. Application Data

(60) Provisional application No. 63/303,337, filed on Jan. 26, 2022.

(51) Int. Cl.
| | |
|---|---|
| *H04L 29/06* | (2006.01) |
| *G06F 21/44* | (2013.01) |
| *G06F 21/75* | (2013.01) |

(52) U.S. Cl.
CPC .............. *G06F 21/44* (2013.01); *G06F 21/75* (2013.01)

(58) Field of Classification Search
CPC ................................ G06F 21/44; G06F 21/75
USPC .......................................................... 726/18
See application file for complete search history.

(56) References Cited

U.S. PATENT DOCUMENTS

| | | | | |
|---|---|---|---|---|
| 8,874,926 B1 * | 10/2014 | Edwards | ............... | H04L 9/3247 |
| | | | | 713/180 |
| 2018/0145838 A1 * | 5/2018 | Wang | .................... | H04L 9/3278 |
| 2021/0125967 A1 * | 4/2021 | Zhai | .................... | H01L 25/0657 |
| 2022/0417041 A1 * | 12/2022 | Howard | .................... | H04L 9/14 |

OTHER PUBLICATIONS

Anderson, J.H., "A PUF Design for Secure FPGA-Based Embedded Systems," 15th Asia and South Pacific Design Automation Conference, pp. 1-6 (2010).

(Continued)

*Primary Examiner* — Jason K Gee

(74) *Attorney, Agent, or Firm* — Sterne, Kessler, Goldstein & Fox P.L.L.C.

(57) ABSTRACT

Embodiments described herein include a system, apparatus, article of manufacture, method and/or computer program product embodiments, and/or combinations and sub-combinations thereof, for delay-based physical unclonable functions (PUFs) for chiplets to verify system integrity. A die may include a plurality of chiplets including a first chiplet and a second chiplet. The first chiplet may be connected to the second chiplet via an interposer. As part of an authentication process, the first chiplet may request the second chiplet to transmit a signal via one or more wires of the interposer. A first signature based on the characteristics of the transmitted signal may be measured at a first time, which constitutes the first evaluation of the PUF. The first signature may be used as a baseline comparison for subsequent signatures as a means to confirm that the chiplets, interposers, and/or interconnects have not been altered or modified.

20 Claims, 6 Drawing Sheets

100

(56)                    References Cited

OTHER PUBLICATIONS

Becker, G.T.,et al., "Security Analysis of Index-Based Syndrome Coding for PUF-Based Key Generation," IEEE International Sysmposium on Hardware Oriented Security and Trust (HOST), pp. 20-25 (2015).

Gassend, B., et al., "Silicon Physical Random Functions," Proceedings of the ACM Conference on Computer and Communications Security pp. 148-160 (Nov. 2002).

Guajardo J., et al., "FPGA Intrinsic PUFs and Their Use for IP Protection," Cryptographic Hardware and Embedded Systems, LNCS 4727, pp. 63-80 (2007).

Immler, V., "Secure Physical Enclosures from Covers with Tamper-Resistance," IACR Transactions on Cryptographic Hardware and Embedded Systems, vol. 2019. No. 1, pp. 51-96 (2018).

Kehlet, D., et al., "Accelerating Innovation Through A Standard Chiplet Interface: The Advanced Interface Bus (AIB)," Intel White Paper, 9 pages (2017).

Kumar, S.S., et al., "Extended Abstract: The Butterfly PUF Protecting IP on every FPGA," IEEE International Workshop on Hardware-Oriented Security and Trust, pp. 67-70 (2008).

Lee, H.J., et al., "Multi-die Integration Using Advanced Packaging Technologies," IEEE Custom Integrated Circuits Conference, 7 pages (2020).

Li, T., et al., "Chiplet Heterogenous Integration Technology-Status and Challenged," Electronics 9, 670, 12 pages (Apr. 2020).

Lin, M.S., et al., "A 7nm 4GHz Arm-core-based CoWoS Chiplet Design for High Performance Computing," 2019 Symposium on VLSI Circuits Digest of Technical Papers, pp. C28-C29 (Jun. 2019).

Lofstrom, K., et al., "IC Identification Circuit using Device Mismatch," IEEE International Solid-State Circuits Conference Digest of Technical Papers, pp. 372-373 (2000).

Maes, R., et al., "Intrinsic PUFs from Flip-Flops on Reconfigurable Devices," 3rd Benelux Workshop on Information and System Security, vol. 17, pp. 1-17 (2008).

Mahajan, R., et al., "Embedded Multidie Interconnect Bridge—A Localized, High-Density Multichip Packaging Interconnect," IEEE Transactions on Components, Packaging and Manufacturing Technology, vol. 9, No. , pp. 1952-1962 (Oct. 2019).

Majzoobi, M., et al., "FPGA PUF using Programmable Delay Lines," IEEE International Workshop on Information Forensics and Security, 6 pages (Dec. 2010).

Morozov, S., et al., "An Analysis of Delay Based PUF Implementations on FPGA," Reconfigurable Computing: Architectures, Tools and Applications, Springer, pp. 382-387 (2010).

Pedregosa, F., et al., "Scikit-learn: Machine Learning in Python," Journal of Machine Learning Research 12, pp. 2825-2830 (2011).

Rose, S., et al., "Zero Trust Architecture," NIST Special Publication 800-207, 59 pages (Aug. 2020).

Saban, K., "Xilinx Stacked Silicon Interconnect Techology Delivers Breakthrough FPGA Capacity, Bandwidth, and Power Efficiency," White Paper: Virtex-7 FPGAs, 10 pages (Dec. 2012).

Sander, O., et al., "Intrinsic identification of Xilinx Virtex≡FPGA devices uninitialized parts of configuration memory space," IEEE International Conference on Reconfigurable Computing, pp. 13-18 (2010).

Su, U., et al., "A 1.6pJ/bit 96% Stable Chip-ID Generating Circuit using Process Variations," IEEE International Solid-State Circuits Conference Digest of Technical Papers, pp. 406, 407, and 611 (2007).

Suh, G.E., et al., "Physical Unclonable Functions for Device Authentication and Secret Key Generation," 44th ACM/IEEE Design Automation Conference, pp. 9-14 (2007).

Tian, S., et al., "Fingerprinting Cloud FPGA Infrastructures," ACM/SIGDA International Symposium on Field-Programmable Gate Arrays, pp. 58-64 (2020).

Wild, A., et al., "Enabling SRAM-PUFs on Xilinx FPGAs," 24th International Conference Field Programmable Logic and Applications, pp. 1-4 (2014).

Yu, M.D., et al., "A Lockdown Technique to Prevent Machine Learning on PUFs for Lightweight Authentication," IEEE Transactions on Multi-Scale Computing Systems, vol. 2, No. 3, pp. 146-159 (Apr. 2016).

Yu, M.D., et al., "Secure and Robust Error Correction for Physical Unclonable Functions," IEEE Design & Test of Computers, vol. 27, No. 1, pp. 48-65 (2010).

* cited by examiner x4   x12   x21   x30   x40   x49

500

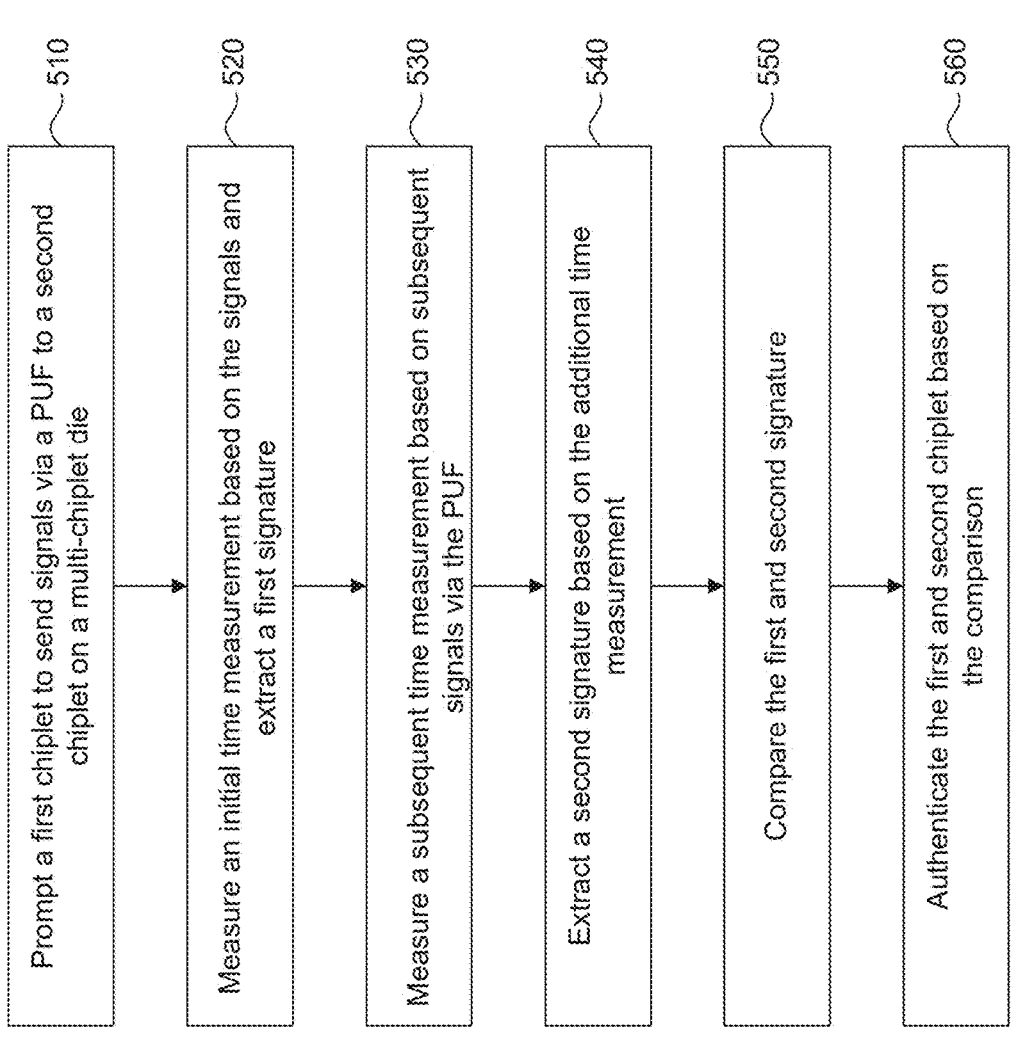

510 — Prompt a first chiplet to send signals via a PUF to a second chiplet on a multi-chiplet die 520 — Measure an initial time measurement based on the signals and extract a first signature 530 — Measure a subsequent time measurement based on subsequent signals via the PUF 540 — Extract a second signature based on the additional time measurement 550 — Compare the first and second signature 560 — Authenticate the first and second chiplet based on the comparison

FIG. 5

DELAY-BASED PUF FOR CHIPLET INTERCONNECTS

CROSS-REFERENCE TO RELATED APPLICATION

This application claims priority under 35 U.S.C § 119(e) to U.S. Provisional Patent Application Ser. No. 63/303,337, filed on Jan. 26, 2022, which is incorporated herein in its entirety by reference

TECHNICAL FIELD

This disclosure is generally directed to delay-based physically unclonable functions (PUFs) for chiplets to verify system integrity.

BACKGROUND

Chip manufacturers normally rely on Moore's Law to create complex integrated systems on a single silicon die. More recently, with increasing design complexity, smaller nodes and a shift to Systems-on-Chip (SoCs) architectures, manufacturers are beginning to run into the limits of Moore's law. Large single, or monolithic, designs are becoming more impractical as the physical size of the integrated circuits increase which leads to decreasing yields of manufacturing such designs. Accordingly, manufacturers have explored Systems-on-Chip (SoCs) architectures for these increasingly complicated integrated systems. But shifting to SoC architectures involving heterogeneous type dies (as opposed to monolithic dies) presents its own challenges because communications between the multiple components on the heterogeneous die may be more susceptible to security attacks such as probing and die swap at the interconnects between these components.

SUMMARY

Provided herein are system, apparatus, article of manufacture, method and/or computer program product embodiments, and/or combinations and sub-combinations thereof, for delay-based PUFs for components on SoCs, or chiplets, to verify system integrity of the communications between the components.

An example embodiment of the present disclosure may include a plurality of chiplets including a first chiplet and a second chiplet. The first chiplet may be connected to the second chiplet via an interposer. As part of an authentication process, the first chiplet may request the second chiplet to transmit a signal via one or more wires of the interposer. A circuit connecting the first and second chiplets may be used to generate the signal. A first signature based on the characteristics of the transmitted signal may be measured at a first time, which constitutes the first evaluation of the PUF. The first signature may be based on an initial time measurement of the signal transmitted between the first chiplet and the second chiplet. The first signature may be used as a baseline comparison for subsequent signatures as a means to confirm that the chiplets, interposers, and/or interconnects have not been altered or modified. A second signature may be measured at a second time subsequent to the first time. The second signature may be based on an additional time measurement of a subsequent signal using the PUF connecting the first chiplet and the second chiplet via the interposer. The first and the second signature may be compared. The second chiplet may be authenticated based on comparing the first signature and the second signature.

BRIEF DESCRIPTION OF THE FIGURES

The accompanying drawings are incorporated herein and form a part of the specification, illustrate the present disclosure and, together with the description, further serve to explain the principles of the disclosure and enable a person of skill in the relevant art(s) to make and use the disclosure.

FIG. 5 is an example method for delay-based PUFs for chiplets to verify system integrity, according to some as embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1B:
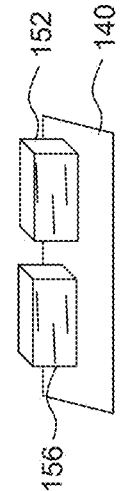
FIG. 1B illustrates a close up of chiplets, according to some embodiments.

Provided herein are system, apparatus, article of manufacture, method and/or computer program product embodiments, and/or combinations and sub-combinations thereof, for delay-based PUFs for chiplets to verify system integrity of communications between the chiplets on Systems-on-Chip (SoCs) architectures.

Chiplets overcome the limitations of manufacturing increasingly complex integrated systems on monolithic dies. Chiplets are formed by partitioning a larger chip design into multiple smaller components. Chiplets are smaller dies that may be separately fabricated with standardized interfaces, which may then be integrated into a larger system by assembly on a passive silicon interposer or a bridge that may connect the chiplets to each other.

Single die SoCs face different security risks than heterogeneous die SoCs (with multiple chiplets). A single manufacturing vendor has more control of on-chip components that are placed on the die so security threats faced by single die SoCs generally involve attacks from outside of the die. In contrast, heterogeneous dies rely on chiplets that may be manufactured by different entities. Because of the different entities, communications between chiplets are provided via standardized interfaces, or interconnects, which allow the chiplets to be integrated onto the SoC in various configurations. Chiplet configuration therefore provides flexibility in creating SoCs where chiplets may be interchanged on the die for improved features and performance. However, this flexibility, provided via the standardized interconnects, leads to increased security exposure. For example, die swapping, interface tampering, and man in the middle attacks are made possible and easier to execute with the distinct segregation of the dies. One may not be able to assume that other chiplets on the die that are receiving or transmitting signals to the chiplet are honest and not nefarious actors posing as a trusted assembly.

Embodiments of delay-based PUFs on chiplets provided herein address these security risks by providing a zero-trust mechanism for establishing trust between chiplets on a SoC. In some embodiments, to verify the integrity of a neighboring untrusted chiplets, a chiplet may measure the delays of signals arriving from the neighboring untrusted chiplets and may compare the measured information against expected measurements to determine whether to trust the neighbor. This may be accomplished by extracting delay signatures from inter-die connections through an interposer in chiplet-based systems, with common-mode rejection of undesirable clock and environmental variations. Delay signatures may be caused by physical manufacturing variations of the chiplets and the shared interposer. Accordingly, delay signatures between chiplets and with a shared interposer may have expected values based on these variations. Delay signatures may be associated with signature (also referred to as fingerprints) which may be unique to the chiplets and the shared interposer. In some embodiments, the interposer is a passive silicon interposer. Embodiments described herein address the security risks associated with chiplets, namely traceability (e.g., of signals between chiplets) and authentication (e.g., confirming identity of other chiplets on the die). The present disclosure addresses security issues of chiplets through the use of physically unclonable functions (PUFs), and in particular, delay-based PUFs. Other embodiments of the present disclosure include the use of an active interposer, detecting impendence changes caused by physical probes on an output wire, or cryptographic protocols. Use of delay-based PUFs represent a low-cost technology to support security of chiplet interfaces.

With regard to the security risks of traceability and authentication, a chiplet may interface with other chiplets that it does not know or trust. Therefore, it may not be assumed that all chiplets will have security-enhancing features, such as PUFs. The present disclosure addresses how a trusted chiplet may support integrity attestation of a system in which the chiplet may be one component among other untrusted chiplets. Relevant threats may include the possibility that a neighboring chiplet has been changed over a period of time or that its communication through an interposer may be probed, spoofed, or subjected to man-in-the-middle attacks. Utilizing a delay-based PUF may be ideal for verifying system integrity and may be accomplished using capabilities that are currently available in chiplets.

Previous methods to support security of methods in multiple chiplet systems are either complicated or expensive. For example, an active interposer may be used as a secure-by-construction root of trust (RoT) between chiplets. The active interposer may contain logic to continuously monitor and police traffic between chiplets to ensure authenticity and system integrity. However, the active interposer must be large enough to interface with all chiplets, which is complex.

Another method in commercially available systems utilizes cryptographic protocols to create secure channels between dies. Some cryptographic protocols may feature secure message passing, authentication, attestation, and firmware download while protecting against firmware copying/tampering, chiplet counterfeiting and chiplet disabling/modifying. These cryptographic protocols are already trusted, but require a substantial cost for computations. However, the emergence of competing solutions supports the desire to find ways to establish system level security from chiplets. Using inter-die delay PUFs, as described herein, overcomes these security issues in multi-die systems.

In some embodiments, different types of chiplets may be available to be used with generic features such as source-synchronous clocking. In source synchronous clocking, a transmitting device forwards it's transmit clock along with the data wires to a receiving device. The receiver may use a controllable delay line followed by a balanced tree routing to de-skew the received clock and ensure that the arriving data signals are sampled near the center of each bit for reliable communication.

For example, a chiplet may use an array of interface standards for chiplet to chiplet connections, such as an advanced interface bus (AIB) or Universal Chiplet Interconnect Express (UCIe), which may allow for standardization for the inter-die interfaces. The inter-die interfaces may lay on adjacent edges of two chiplets. An array of microbumps along the edge of each chiplet is often utilized. Clock forwarding and delay tuning on the receiver side may be used for communication.

Other chiplets may use other technologies for connections between chiplets. For example, an interface may be denoted as LIPINCON, low-voltage in-package interconnect and the packaging technology may be denoted as chip on wafer on substrate (CoWoS).

In the present disclosure, an exemplary FPGA comprises at least two chiplets connected to each other via an interposer. The interposer may comprise a plurality of interconnect traces, or wires, through which the chiplets may transmit and receive signals from other chiplets. The FPGA may further include a controller in communication with the chiplets via the interposer and that may be configured to facilitate the determination of delay in signals transmitted between the chiplets. In some examples, the controller may be configured to receive a number of detected timing faults in patterns transmitted by respective pattern generators on each chiplet. In some embodiments, each chiplet may comprise fault detection logic to detect timing faults in patterns that contain rising transitions. In other words, the measured delay may be based on the number of detected timing faults received by the controller.

In some embodiments, for some multi-die FPGAs when implemented as Xilinx FPGAs, stacked silicon interconnect (SSI) may be used. SSI combines multiple FPGA dies into a single device using microbump connections to a shared silicon interposer. FPGA chiplet dies may include super logic regions (SLRs) and may have low latency connections known as super long lines (SLLs) that connect adjacent edges of neighboring SLRs. Through-silicon vias (TSV) through the interposer may connect down to the package substrate. FPGAs may provide users with control over clocking and the reconfigurable logic allows for transmitting arbitrary known patterns on demand across chiplet boundaries. FPGAs in the present disclosure are not limited to SSI and Xilinx FPGAs.

The chiplet inter-die interface may be composed of one or more wires through an interposer. The interposer itself may be an electrical interface routing between one socket or connection to another socket or connection. The interposer may spread a connection to a wider pitch or to reroute a connection to a different connection. In some embodiments, a chiplet connected to the interposer may initiate authentication of a neighboring chiplet by selecting a subset (e.g., one or all) of the wires in the interposer to use for detecting delays in signals received from the neighboring chiplet. The number of wires selected may be balanced by the amount of processing that is required to determine the delay. The greater the number of wires that are selected for generating the signal, the more robust the signature is provided to generate a PUP. In some embodiments, the number of selected wires for transmitting the signals used for detecting the signature may be preset. In some embodiments, the number of selected wires may be dynamically selected. Increasing the number of wires selected for transmitting the signals increases the security of authentication step but also increases the processing needed to detect the delays in the signals.

Figure 1A:
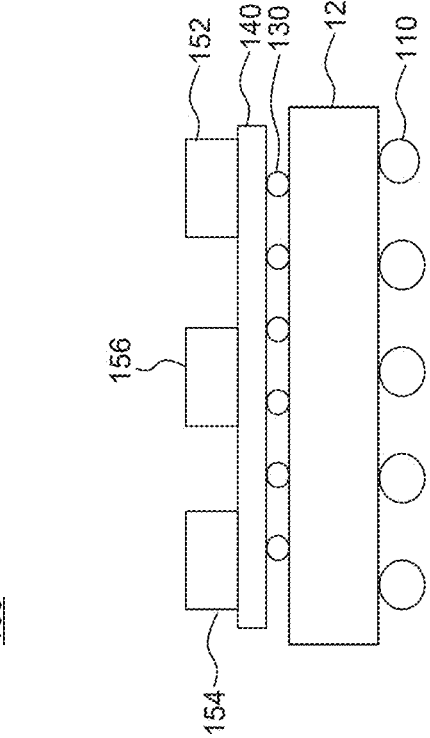
FIG. 1A illustrates a multi-chiplet system, according to some embodiments.

FIG. 1A depicts a multi-chiplet system 100, according to some embodiments. A package substrate 120 may be on solder balls 110. On the package substrate 120 is C4 bumps 130. A silicon interposer 140 is on the C4 bumps 130. Multiple SLRs 152, 154, 156 may be on top of the interposer 140.

FIG. 1B depicts a close-up of chiplets 152 and 156. The SLRs 152 and 156 are atop the interposer 140, according to some embodiments. Within the SLRs 152 and 156 are microbumps (not labeled). Microbumps may serve as vertical interconnects between chiplets and the interposers. The TX flip-flop in the transmit chiplet drives the signal thru the microbump connections of its own die, across the interposer wire and thru the microbump of the neighbor die where it reaches the corresponding RX flip-flop.

During the validation, a picosecond-scale delay changes may be measured that may arise from tampering. Analysis across a variety of design manipulations to identify specific sources of entropy in the system may be performed. A PUF may be a circuit on the chiplet that produce outputs using manufacturing process variations of the one or more chiplet and the interconnecting interposer. This output may represent entropy. The PUT derives the entropy from these process variations.

In addition to the security of chiplets, standardization of chiplets is necessary. Standardization of interface protocols allows for easy plug-and-play compatibility between chiplets. Additionally, standardization is required such that the full potential of the technology may be realized. Standardized models include power, IO, behavioral, and test. Modularity and interoperability enable heterogeneous integration with chiplets has implications for how they may be attacked and how they may be protected.

PUFs are circuits that may produce outputs using entropy derived from fabrication process variations of each circuit. PUF outputs may be persistent over time, but may be disturbed by noise on the die. The source entropy of a PUF grows proportionally to its area. Generated values from the available entropy may create strong PUFs or weak PUFs. Strong PUFs, such as arbiter PUFs and may have a large space of input challenges, may map inputs to outputs according delay variations of, for example, application-specific integrated circuit (ASIC) or FPGA cells.

Strong PUFs are subject to for example, modeling attacks, where an adversary uses a set of known-input-output examples to train a model that may eventually predict the PUF output for any input, because each input-output pairing may leak information about the source entropy. Weak PUFs lack a large input space and are seen as device-tied constants. Both strong and weak PUFs are subject to noise.

The output of a PUF may be kept secret if it is used as a key in a cryptographic protocol, which may require error correction to be performed with helper data to compensate for noise. Error correction protocols, rely on standard error correcting codes, which may compromise some entropy.

In some embodiments, when considering integrity checking calls for one chiplet, a trusted chiplet of the present disclosure may measure the propagation delays of signals arriving through the interposer from a neighboring chiplet. A multi-chiplet system as described herein may be used with multiple dies connected through an interposer. In some embodiments, the chiplets may be SLRs and the wires through the interposer may be SLLs.

The PUF implementation presented herein may include several security and hardware requirements. For example, a PUF implemented with the trusted chiplet may have a physical structure used to derive responses that are difficult to clone, but easy to measure. Tampering with the structure may permanently alter its response in subsequent measurements. Inter-die interconnect satisfies these properties, for example.

The basis of the security of the PUFs of the presented disclosure is based on entropy derived by the PUF from process variations of the interposer and connected chiplets. Depending on the application of the PUFs, persistent memory and hardware primitives for signing, encryption decryption, and verification of measured delays may be available. In some embodiments, the initial enrollment phase of the PUFs includes the device generating and securely storing a first set of measurements involving the entropy. In some embodiments, measurements may be retaken and compared to the enrolled data to generate a key or a security flag.

Depending on which application is used, the measurements may be checked at boot time to authenticate neighboring dies or at regular intervals to check for probes. Based on the measurements, the assumption may then be made that the receiving chiplet is trusted, but the circuitry beyond its die is not trusted. This assumption may be justified by inter-die wires being physically larger and more exposed than on-die wires.

Chiplets generally present a unique security challenge due to the fact that chiplets expose new attack surfaces that may differ from those in monolithic devices. Methods of the present disclosure solve these issues by utilizing a die to authenticate its neighbor and verify system integrity. These methods also solve threats such as tampering and probing attacks against chiplet systems on passive interposers. One representative tampering threat is die-swapping of a transmitting chiplet. This involves trying to swap a chiplet by measuring the flop-to-flop delays along the transmitter-interposer-receiver paths and tuning the replacement chip to have the same picosecond-level delays.

Physical probing represents another threat to mitigate within a die or between dies on a PCB with circuitry that detects an impedance change on output wires. Probing has practical considerations such as shielding around the interposer wires, the density of the wires, and probing may require different detection criteria that may be sensitive to changes in a small number of wires instead of using an aggregate metric of similarity that considers all wires.

The design for measuring propagation delay relies on clock phase adjustment on the receiving chiplet. Clock phase adjustment is known for source-synchronous clocking in chiplets to de-skew a forwarded clock on the receiving die such that the clock will reach the sampling flip-flops at a time coinciding with the center of each bit. The method proposed herein may measure the propagation delay of arriving signals to determine the phase adjustment.

Here, the delay may be defined as the exact time required for each signal to propagate from the TX (transmitter) flip-flop on one chiplet to the RX (receiver) flip-flop on another chiplet. In some embodiments, the delay may be further defined as the time difference (i.e., skew) between the clocks of the TX and RX flip-flops that may cause a transmitted rising transition to be sampled by the receiver as 0 and 1 with equal probability. That is, the delay has a failure probability ($p_{fail}$) of 0.5. When the clock skew is smaller than the wire delay, the wire transition may be incorrectly sampled as a 0 ($p_{fail}$>0.5). When the skew is larger than the wire delay, it is less likely to be sampled as 0 ($p_{fail}$<0.5).

The phase of the receiving clock may be adjusted in discrete steps such that there will not be one particular step that causes to $p_{fail}$ be exactly 0.5. $p_{fail}$ may be measured across a range of phase steps and then interpolated to infer the phase that would have caused $p_{fail}$=0.5. The clock skew, which is in picoseconds, at this inferred phase shift may be considered to be the measured delay of a signal that is transmitted between the chiplets via the interposer. The delay of the signal being transmitted may be measured independently on each chiplet.

Figure 2:
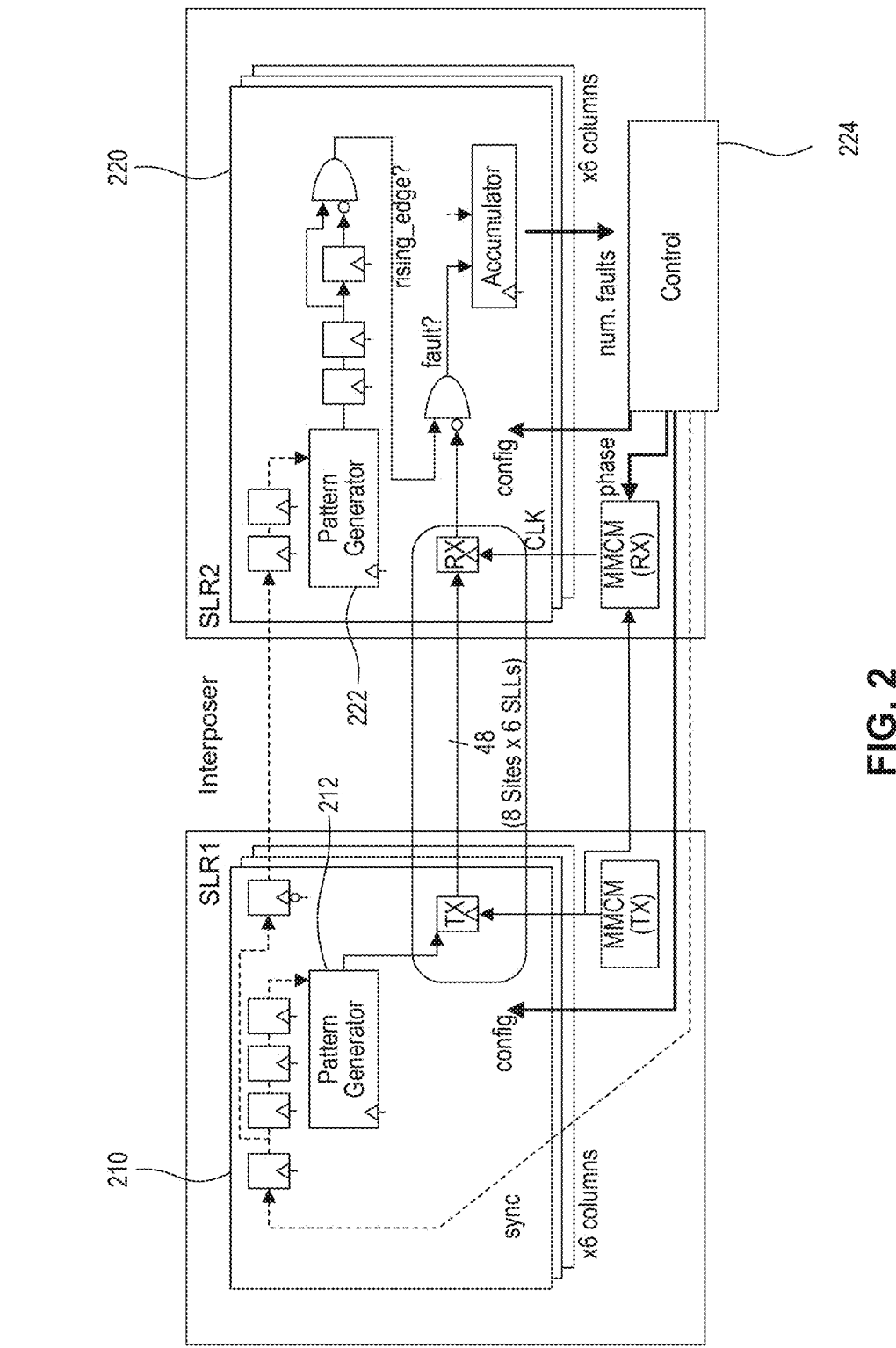
FIG. 2 illustrates a schematic of a delay-based interconnect system for chiplet interfaces, according to some embodiments.

FIG. 2 illustrates a schematic of a delay-based interconnect system for chiplet interfaces on a multi-chiplet 200, according to some embodiments. The design of the multi-chiplet 200 may be organized into columns and comprises chiplet 210, chiplet 220, and controller 224. In some embodiments, chiplet 210 may be an untrusted chiplet and chiplet 220 may be a trusted chiplet that is configured to authenticate chiplet 210. In some embodiments, chiplet 210 may a trusted chiplet configured to authenticate chiplet 220.

In some embodiments, six instances of the inter-delay circuit may be placed on the FPGA, such as a Xilinx FPGA, each with eight Laguna sites on the transmitting and receiving SLRs. A Laguna site is specific to Xilinx FPGA and is not intended to be limiting to any aspect of the disclosure and refers to the group of related elements and their connectivity. Sites may include site pins, site wires, and a basic element of logic. However, the multi-chiplet 200 is not limited to this embodiment. Laguna tiles have dedicated flip flop sites to aid in crossing the SLR divide. Each Laguna site includes six Laguna cells, which are TX-RX flip-flop pairs dedicated to specific SLLs. The TX flip-flop in one Laguna cell drives the signal through the microbump connections of its own die, across the interposer wire, and through the microbump of the neighbor die where it reaches the corresponding RX flip-flop.

In some embodiments, the multi-chiplet 200 may include 48 SLLs per column and 288 SLLs in total. The 48 SLLs per column may represent a small fraction of the 1440 SLLs available. Having a relatively low utilization of the SLLs reduces congestion and simplifies placement. In some embodiments, multi-chiplet 200 may have higher utilization which may produce a richer delay signature.

Chiplet 210 may contain pattern generator 212 and chiplet 220 may contain pattern generator 222 and the receive side of each chiplet may include additional fault detection logic. In some embodiments, the pattern generators 212 and 222 may be implemented as identical 16-bit linear-feedback shift register (LFSRs). A LFSR is a shift register whose input bit is a linear function of its previous state. The purpose of a LFSR is to generate a pseudorandom sequence including rising transitions to transmit across the interposer, while checking for timing faults.

On the transmitting side, the pattern generator 212 produces a value in each cycle that is sent across the interposer. On the receiving side, the pattern generator 222 produces a fault-free copy of the pattern sent by the transmitter to determine which samples may be checked for rising transition timing faults. During a clock sweep, the receiver may determine that a rising edge was sent and a fault count may be incremented if a 0-value was sampled, which indicates a timing fault.

The two SLRs may be configured as different clock domains, with variable clock phase over a certain time period during clock sweeping. However, there is a requirement to ensure proper synchronization between the two pattern generators. Pipelining is used on the synchronization signal to relax placement and ensure timing constraints may be met within each SLR. Additionally, a negative edge triggered flip-flop may be used to send the synchronization signal across the clock domain boundary on the negative edge of the transmit clock. This makes it insensitive to the range of clock phase differences used during the sweep.

Figure 3:
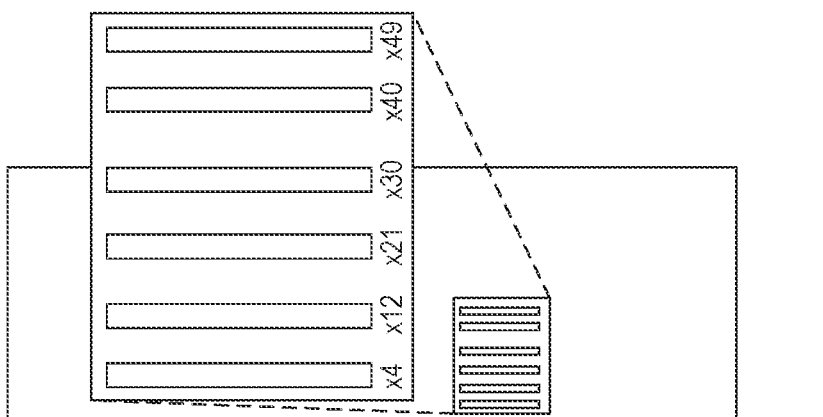
FIG. 3 illustrates a floorplan with SLR regions of a chiplet based FPGA, according to some embodiments.

FIG. 3 illustrates a floorplan with SLL regions of the multi-chiplet 200, according to some embodiments. In some embodiments, the FPGA may include three vertically arranged SLRs with 17,280 SLLs going across each boundary. The chiplet may be implemented on a FPGA board, for example, if cloud scaling is desirable in the future. A compute instance with FPGAs that may be programmed to create custom hardware accelerations for the chiplet may be used to scale the testing such that the uniqueness of a larger population may be measured. In some embodiments, the compute instance may include additional shell logic to handle communication and may be confined to the right six columns of the FPGA.

In some embodiments, the six leftmost Laguna columns may be used and within the column, every sixth Laguna site may be used. It is worth noting that the configuration may include any number of column, site, or SLR. Most notably, the chiplet comprises a TX-RX flip-flop pair crossing an interconnect, such as an interposer. In some embodiments, the sites that transmit across the SLLs are on SLR1. One pattern generator and one accumulator are instantiated per site and the delays of the six SLLs in the site may be measured sequentially. In some embodiments, only one SLL per column may be active at a time.

A Mixed-Mode Clock Manager (MMCM) macro may be used for clock generation as it allows for phase shifting of clocks at runtime. In some embodiments, the phase of the receive clock is shifted relative to the forwarded clock from the transmitter, in increments of 14.286 picoseconds.

In some embodiments, the interface and clock primitives of the chiplet may be unrestricted. Controllable delay lines may be incorporated on the receiving side, allowing for de-skewing of the forwarded clock. Given these capabilities, the method herein may be adapted to many types of chiplets by modifying the control logic to interface with the existing delay primitives of each type of chiplet from various manufacturers.

The PUF proposed in the present disclosure may be implemented as a differential design that utilizes entropy from delay variations within any interconnects between chiplets on a die. One such example of an interconnect is a SLL when the die is implemented using a Xilinx FPGA. To be used as a part of a PUF, the interconnect delay variation across chiplet instances may exceed the delay variations across trials on a given compute instance.

Measured delays may be collected from the computing instance. For example, when using Xilinx FPGAs, the delay is measured across the SLL. The measured SLL delays are generally higher, but the difference may not be uniform. For example, the mean and standard deviation of the average delays may be measured. In some embodiments, the mean and standard deviation are 0.51 ps and 0.52 ps, respectively, which indicates that the impact of noise is relatively low.

Skew or bias may be associated with the column and with the cell within each site. Positive delay differences may consistently occur, which indicates there is a bias associated with the overall speed of a given chiplet.

The biases may be expected to be additive, meaning that the expected delay of the SLL can be predicted as the sum of its biases. To understand the prediction, the experimental data may be fit to a model, which describes delay of each SLL as additive with respect to chip, column, site, and cell. For example, the model may be Xw=y, where w represents the unknown bias associated with each feature. Each SLL delay measurement may be associated to one chiplet, one column, one site, and one cell.

Ridge regression finds weights w that may minimize the following equation:

$$\|Xw - y\|_2^2 + \alpha\|w\|_2^2$$

In some embodiments, the delay does not vary much across the sites and a large part of the overall SLL delay may be attributed to the bias of the FPGA instance as a whole. A significant component of the delay may be consistent with being random variation. The standard deviation of the residual delay is 7.309 ps. A simulation model that may be used may not explicitly account for bias that may be caused by differences in routing through the interposer or differences in routing on the SLR to reach the correct location of the arrayed microbump that connects the SLR to the interposer. The model may indicate an asymmetry that mirrors how the SLLs are organized into columns or cells.

In the present disclosure, the PUF is used as a protocol where a trusted chiplet may obtain a physical signature from a signal transmitted between the trusted chiplet and a neighboring chiplet to check the integrity of its system and the authenticity of the neighboring chiplet. The output of the PUF is the signature of the signal and represents a measurement of time for the signal to physically propagate from the transmitter chiplet through the interposer to the receiver chiplet. In some embodiments, this signature is is measured during application of the digital signal generated by pattern generators, such as pattern generator 212 and pattern generator 222 and the digital signal is a known pattern. In some embodiments, the measurement of time for the signal to physically propagate includes detection of a number of timing faults associated with the known pattern.

In embodiments where chiplet 210 is an untrusted chiplet, chiplet 220 may initiate the protocol by prompting chiplet 210 to transmit a known pattern through an interposer. The pattern itself may be non-secret and known to both the trusted chiplet 220 and untrusted chiplet 210. While the pattern is being transmitted, the receiver performs clock sweeping to measure the PUF and extract a delay signature that may be caused by the physical variation of the two chiplets and the shared interposer.

The circuit that generates the signature may be a type of weak PUF. Weak PUFs include repeated instantiations of a unit cell that may operate independently of the others. In some embodiments, the PUF cell may be based on a differential delay measurement.

Figure 4:
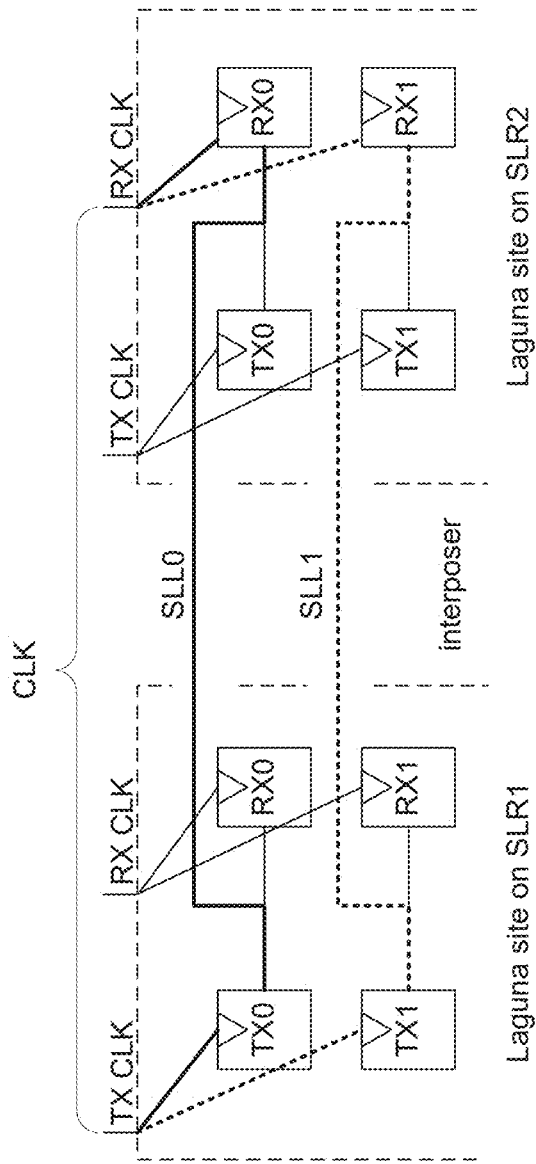
FIG. 4 illustrates the clock distribution for the interface registers of the delay-based interconnect system, according to some embodiments.

FIG. 4 illustrates the clock distribution for the interface registers of the delay-based interconnect system, according to some embodiments. The PUF cell includes two SLLs and the TX and RX flip-flops of the Laguna cells on both ends of each SLL. The six SLLs of each Laguna site may be paired into three PUF cells using arbitrary pairings (0,1), (2,3), and (4,5).

Each Laguna site may have a single input for the TX clock and for the RX clock. Two SLLs of each PUT cell within the site may be impacted similarly by noise and variation associated with clock distribution, which may reduce the impact of clock on the PUF response.

Differential PUF outputs are more stable than, for example, single-ended delays. The differential nature of the PUF mitigates drift that may be caused by factors that are common-mode to its two SLLs. PUP outputs may be stable and do not drift significantly because common changes to the delay of the two SLLs in the cell may cancel out, which confirms the benefit of using the differential measurement. The PUP may serve as a reliable and unique signature.

Temperature may have an impact on the reliability of the PUF. Due to non-uniform sensitivity of SLL delay to temperature, the PUF outputs may drift, with the direction of the drift depending on which of the two SLLs is more sensitive to temperature. The PUF outputs may be used without compensation, within-class comparisons made across a large disparity approach, the between-class distances under nominal conditions. The drift of each SLL is linear with respect to temperature, which allows for a simple compensation making the PUF robust across a wide temperature range. The delay of individual SLLs based on the amount of aggregate SLL delay change between two measurements may be compensated for. Each SLL has a compensation factor, which may be a unitless quantity that denotes the amount of its own delay change relative to a certain amount of average delay change across all SLLs.

A SLL with typical sensitivity may have a compensation factor of 1.0, which means that it is expected to get 1 ps slower when the average delay across all SLLs increases by 1 ps. More temperature sensitive SLLs may be above 1.0 and less sensitive SLLs may be below 1.0. Measurements may be taken at different temperatures and they then have different mean SLL delays. The second is compensated to the mean SLL delay of the first by adjusting the SLL delays according to their compensation factors, which may allow for a robust comparison between the two measurements. Therefore, with simple compensation, comparisons across large temperature disparities may be only slightly degraded. Additionally, aging does not affect the long-term reliability of delay PUFs.

In the present disclosure, it is proposed that the differential measurement of the PUF causes clock variations to be common-mode and may have a minimal impact on the PUF outputs. A massive change in clock skew may be mimicked by creating an additional design variant in which the MMCM of the receiver has been moved across the SLR boundary. This move may greatly change the clock path and its skew. A strong positive correlation of 086870 may indicate that the clock has a negligible impact on the PUF outputs. This means that the variability observed in the PUFs arises from the SLL themselves, and not the clock routing.

An additional security objective is to authenticate the neighboring chiplets. Hence, false negatives refers to a chiplet that is inauthentic, but is accepted as authentic. False positives refers to when an authentic chiplet is labeled inauthentic.

In some embodiments, chiplets 210 and 20 may be configured to have a single pattern generator and a single accumulator. In some embodiments, one or more wires may be scanned at a time. Once scanned, the values from the accumulator at each chiplet may be read out sequentially for processing by controller 224. The time needed to measure all the wires may be significantly reduced by trading away area to increase parallelism or by reducing the number of edges transmitted. Increasing the area may dramatically decrease latency by unlocking parallelism, without hurting the PUF sensitivity.

In some embodiments, with multiple chiplets, it is not sufficient to verify integrity of an individual die. Stacking multiple dies may cause security concerns. By using a method of chiplet neighbor authentication and tamper sensing, as proposed in the present disclosure, a PUF output derived from the interposer wires that connects two dies may be realized. Additionally, the PUF design may be adapted to any inter-chiplet buses, regardless of manufacturer.

FIG. 5 is an example method 500 for delay-based PUFs for chiplets to verify system integrity of neighboring chiplets, according to some as embodiments. Method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. For example, not all steps 510-560 may need to be performed in order to authenticate chiplets on a multi-chiplet die. Method 500 shall be described with reference to FIGS. 1-4, and specifically chiplet 210 and chiplet 220. However, method 500 is not limited to those example embodiments.

In step 510, a first chiplet may be prompted to send signals through an interposer to a second chiplet. In some embodiments, the signals may be generated by pattern generator 212 or pattern generator 222 depending on which chiplet is being authenticated. For example, chiplet 210 may prompt chiplet 220 to send a known pattern and/or chiplet 220 may prompt chiplet 210 to send a known pattern. The first chiplet and the second chiplet may include a plurality of TX-RX flip-flop pairs. For example, chiplet 210 may include a TX flip-flop that is paired with an RX flip-flop of the chiplet 220 and an RX flip-flop that is paired with an TX flip-flop of chiplet 220.

In step 520, chiplet 210 and chiplet 220 may utilize the signals to measure an initial time measurement, which may represent a measurement of the delay of the signals that are transmitted between the chiplets via the interposer. For example, a TX flip-flop of chiplet 220 may transmit a signal to the RX flip-flop of chiplet 210 and/or a TX flip-flop of the chiplet 210 may transmit a signal to the RX flip-flop of chiplet 220.

In some embodiments, the length of the delay represented by the initial time measurement are unique to the physical characteristics of the die, the chiplets, and the interposer. The delay measurement may therefore be considered a unique signature between chiplet 210, chiplet 220, and the interposer. Any changes to these physical characteristics would cause a corresponding change in the length of the delay. As noted above, the measured delay may be based on the number of timing faults that are detected in patterns transmitted by respective patter generators of each chiplet during a clock sweep. Here, chiplet 210 and/or chiplet 220 may extract a first signature from the initial time measurement where the first signature represents the unique delay measurement of the signals.

In some embodiments, the time measurement may be measured during a clock sweeping operation. Chiplet 220 may the extract the signature from this time measurement. In some embodiments, the signature represents a propagation delay. As noted above, one embodiment for measuring the delay signature of arriving signals relies on a clock phase adjustment on the receiving chiplet.

The die may further include a plurality of wires that connect the first chiplet and the second chiplet via the interposer. In some embodiments, wires may be implemented as super long lines.

Specifically, as seen in FIG. 2, chiplet 210 and chiplet 220 may be present. More chiplets may be present, but for simplicity, only two chiplets are depicted. In embodiments where chiplet 210 and chiplet 220 are implemented with Xilinx FPGAs, each chiplet may comprise Laguna cells. In some embodiments, one or more of chiplet 210 and chiplet 220 may be untrusted. Part of this identification process may include an initial enrollment phase in which a first set of measurements of each chiplet may be taken. This first set of measurements may be stored and used as a baseline comparison against subsequent measurements. The first set of measurements may represent a unique delay signature between the chiplets. In some embodiments, when multichiplet 200 is deployed, chiplet 210 and chiplet 220 may take the subsequent measurements to compare the subsequent measurements to the stored measurements to generate a key or a security flag. In some embodiments, the measurements taken after deployment may be taken at boot time for the purpose of authenticating neighboring dies, or at regular intervals to check for probes.

In step 530, chiplet 210 and chiplet 220 may transmit subsequent signals via the delay circuit and measure a subsequent time measurement based on the subsequent signals. Similar to the time measurement at step 520, the additional time measurement may be a delay measurement of the subsequent signals transmitted via the circuit between chiplet 210 and 220.

In step 540, the chiplet performing the authentication (e.g., chiplet 220) may extract a second signature based on the additional time measurement. Specifically, in step 520 chiplet 210 and chiplet 220 extracted first signature from the initial time measurement. The chiplet (e.g., chiplet 220) may obtain the second signature from the subsequent time measurement based on signals transmitted with one or more neighboring chiplets (e.g., chiplet 210) to check the integrity of the die and the authenticity of neighboring chiplets.

In step 550, chiplet 210 and chiplet 220 may differentiate between the first and second signature based on a comparison. For example, chiplet 220 may identify any differences between the first and second signature. Matching signatures indicate the delay of the signals transmitted between chiplet 210 and 220 are the same; any differences in the signatures indicate changes to the physical characteristics of the connection between chiplet 210 and chiplet 220.

In step 560, chiplet 210 and chiplet 220 may authenticate each other based on the comparison of first signature and second signature. As noted above, a chiplet may not be authenticated if the first and second signature do not match. In some embodiments, the authenticating chiplet may transmit a signal or notification indicating that the untrusted chiplet is not authenticated and may prevent any further communications with the untrusted chiplet. For example, as seen in FIG. 2, the authenticating chiplet (e.g., chiplet 220) may perform the comparison of the signatures to authenticate an untrusted chiplet (e.g., chiplet 210). If the untrusted chiplet is authenticated, the authenticating chiplet may continue communicating with the untrusted (now trusted) chiplet.

Example Computer System

Figure 6:
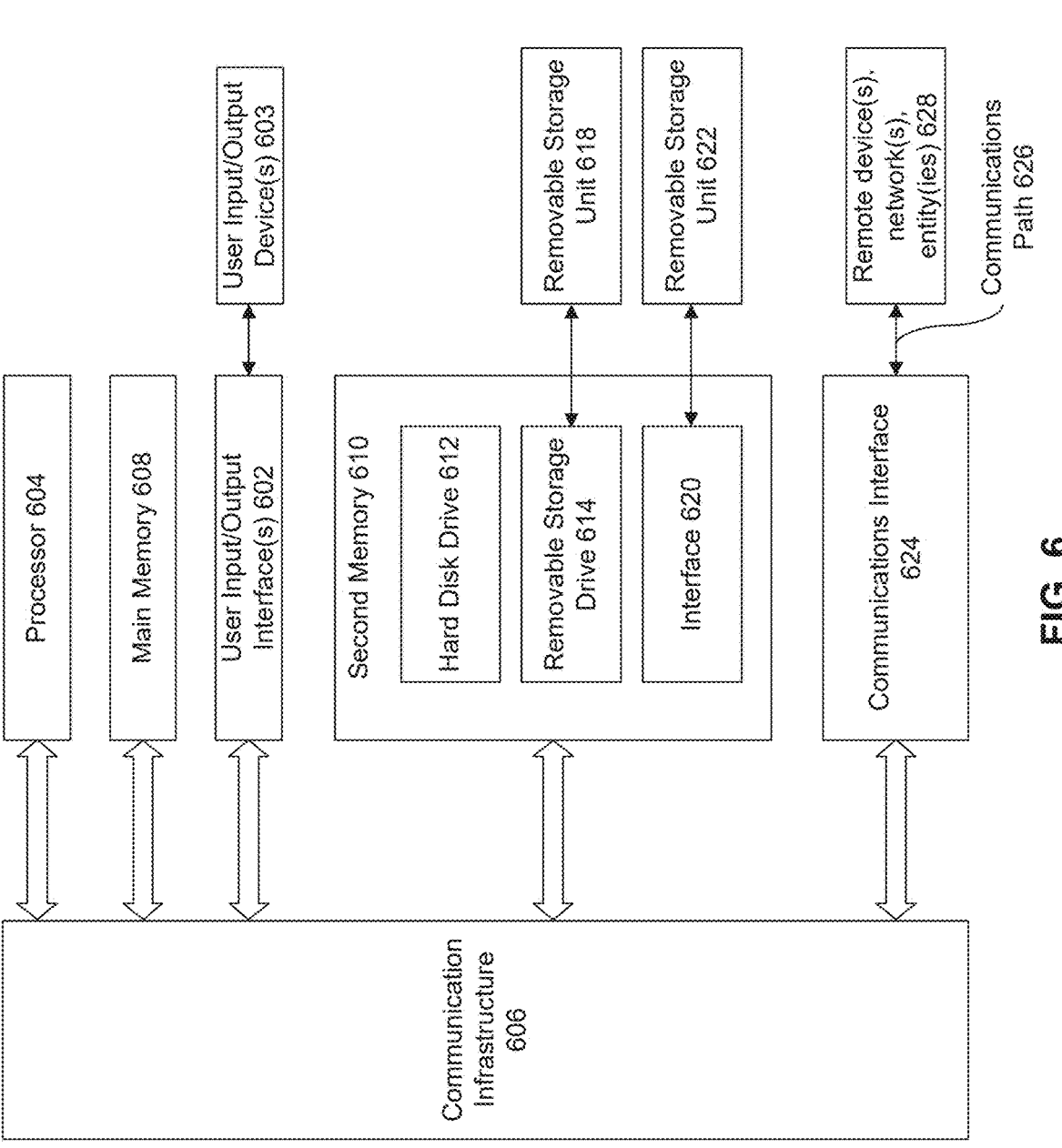
FIG. 6 illustrates an example computer system useful for implementing various embodiments.

Various embodiments may be implemented, for example, using one or more well-known computer systems, such as computer system 600 shown in FIG. 6. For example, the multi-chiplet system 100 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DV), optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A die implementing a systems-on-chip, the die comprising:
   a first chiplet and a second chiplet disposed on an interposer, wherein the first chiplet is connected to the second chiplet via the interposer, wherein the first chiplet and the second chiplet are integrated onto the systems-on-Chip, and wherein the first chiplet is configured to:
      measure, at a first time, a first signature, wherein the first signature is based on an initial time measurement of an initial signal transmitted using a circuit connecting the first chiplet and the second chiplet via the interposer;
      measure, at a second time subsequent to the first time, a second signature, wherein the second signature is based on an additional time measurement of a subsequent signal using the circuit connecting the first chiplet and the second chiplet via the interposer;
      compare the first signature and the second signature; and
      authenticate the second chiplet based on comparing the first signature and the second signature.

2. The die according to claim 1, wherein the first chiplet comprises a first TX flip-flop and a first RX flip-flop and the second chiplet comprises a second TX flip-flop and a second RX flip-flop, wherein the first TX flip-flop and the second RX flip-flop form a first TX-RX flip-flop pair and the first RX flip-flop and the second TX flip-flop form a second TX-RX flip-flop pair.

3. The die according to claim 2, wherein a first TX-RX flip-flop of the first TX-RX flip-flop pair is configured to drive the initial signal through the interposer to a second TX-RX flip-flop of the first TX-RX flip-flop pair, wherein the initial time measurement represents a delay of the initial signal transmitted via the circuit.

4. The die according to claim 1, wherein in comparing the first signature and the second signature, the first chiplet is configured to match the first signature and the second signature.

5. The die according to claim 4, wherein if the first signature and the second signature are different, the first chiplet is configured to:
   determine that the second chiplet is not authenticated; and
   transmit a notification indicating that the second chiplet is not authenticated.

6. The die according to claim 1, wherein the initial time measurement is based on a time signal sent between the first chiplet and the second chiplet.

7. The die according to claim 1, wherein the interposer is a passive silicon interposer.

8. The die according to claim 1, wherein the interposer further comprises a plurality of wires that connect the first chiplet and the second chiplet via the interposer.

9. The die according to claim 1, wherein the initial time measurement is a delay measurement between the first chiplet and the second chiplet.

10. The die according to claim 1, wherein the circuit is a physically unclonable function (PUF).

11. A method comprising:
   connecting, via an interposer, a first chiplet and a second chiplet, wherein the first chiplet and the second chiplet are disposed on the interposer and are integrated onto a systems-on-Chip, wherein the systems-on-Chip is implemented on a die;
   measuring, at a first time, a first signature, wherein the first signature is based on an initial time measurement of an initial signal transmitted using a circuit connecting the first chiplet and the second chiplet via the interposer;
   measuring, at a second time subsequent to the first time, a second signature, wherein the second signature is based on an additional time measurement of a subsequent signal using the circuit connecting the first chiplet and the second chiplet via the interposer;
   comparing the first and second signature; and
   authenticating the second chiplet based on comparing the first signature and the second signature.

12. The method according to claim 11, wherein the first chiplet comprises a first TX flip-flop and a first RX flip-flop and the second chiplet comprises a second TX flip-flop and a second RX flip-flop, wherein the first TX flip-flop and the second RX flip-flop form a first TX-RX flip-flop pair and the first RX flip-flop and the second TX flip-flop form a second TX-RX flip-flop pair.

13. The method according to claim 12, wherein a first TX-RX flip-flop of the first TX-RX flip-flop pair is config- ured to drive the initial signal through the interposer to a second TX-RX flip-flop of the first TX-RX flip-flop pair, wherein the initial time measurement represents a delay of the initial signal transmitted via the circuit.

14. The method according to claim 11, wherein in com- paring the first signature and the second signature, the first chiplet is configured to match the first signature and the second signature.

15. The method according to claim 14, wherein if the first signature and the second signature are different, the first chiplet is configured to:

determine that the second chiplet is not authenticated; and transmit an alert indicating that the second chiplet is not authenticated.

16. The method according to claim 11, wherein the initial time measurement is based on a time signal sent between the first chiplet and the second chiplet.

17. The method according to claim 11, wherein the interposer is a passive silicon interposer.

18. The method according to claim 11, wherein the interposer further comprises a plurality of wires that connect the first chiplet and the second chiplet via the interposer.

19. The method according to claim 11, wherein the initial time measurement is a delay measurement between the first chiplet and the second chiplet.

20. The method according to claim 11, wherein the circuit is a physical unclonable function (PUF).

* * * * *